(12) United States Patent
Hwang et al.

(10) Patent No.: US 10,490,851 B2
(45) Date of Patent: *Nov. 26, 2019

(54) LITHIUM SECONDARY BATTERY

(71) Applicant: SK INNOVATION CO., LTD., Seoul (KR)

(72) Inventors: Duck-Chul Hwang, Gyeonggi-do (KR); Jin-Sub Lim, Daejeon (KR); Kook-Hyun Han, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 35 days.

This patent is subject to a terminal disclaimer.

(21) Appl. No.: 14/728,714

(22) Filed: Jun. 2, 2015

(65) Prior Publication Data
US 2015/0349381 A1 Dec. 3, 2015

(30) Foreign Application Priority Data

Jun. 2, 2014 (KR) .................. 10-2014-0067150
May 7, 2015 (KR) .................. 10-2015-0063878

(51) Int. Cl.
*H01M 10/0567* (2010.01)
*H01M 10/052* (2010.01)
(Continued)

(52) U.S. Cl.
CPC ....... *H01M 10/0567* (2013.01); *H01M 4/485* (2013.01); *H01M 4/505* (2013.01);
(Continued)

(58) Field of Classification Search
CPC .......... H01M 10/0567; H01M 10/052; H01M 10/0566; H01M 4/485; H01M 4/505; H01M 4/525

See application file for complete search history.

(56) References Cited

U.S. PATENT DOCUMENTS

2009/0068561 A1* 3/2009 Sun ................ H01M 4/131
429/223
2011/0052980 A1* 3/2011 Sakata ............ H01M 4/131
429/199
(Continued)

FOREIGN PATENT DOCUMENTS

CN 102013481 4/2011
CN 102214819 10/2011
(Continued)

OTHER PUBLICATIONS

Office Action issued by the State Intellectual Property Office dated Mar. 31, 2017.

*Primary Examiner* — Jimmy Vo
(74) *Attorney, Agent, or Firm* — IP & T Group LLP

(57) ABSTRACT

A lithium secondary battery includes a positive electrode, a negative electrode, and a non-aqueous electrolyte, and more particularly, the positive electrode includes a positive active material including lithium-metal oxide in which at least one metal has the continuous concentration gradient from the center to the surface, and the non-aqueous electrolyte includes a lithium salt, a multinitrile compound, and an organic solvent, thereby improving storage characteristics at a high voltage and lifetime characteristics.

11 Claims, 2 Drawing Sheets

(51) Int. Cl.
 H01M 4/485    (2010.01)
 H01M 10/0566  (2010.01)
 H01M 4/525    (2010.01)
 H01M 4/505    (2010.01)

(52) U.S. Cl.
 CPC ......... *H01M 4/525* (2013.01); *H01M 10/052* (2013.01); *H01M 10/0566* (2013.01); *H01M 2300/0025* (2013.01)

(56) References Cited

U.S. PATENT DOCUMENTS

| | | | |
|---|---|---|---|
| 2013/0101893 A1* | 4/2013 | Dai | H01M 10/0565 |
| | | | 429/163 |
| 2014/0027670 A1* | 1/2014 | Sun | H01M 4/483 |
| | | | 252/182.1 |
| 2014/0057176 A1 | 2/2014 | Park et al. | |
| 2014/0087266 A1* | 3/2014 | Li | H01M 4/485 |
| | | | 429/231.3 |
| 2014/0158932 A1* | 6/2014 | Sun | H01M 4/13 |
| | | | 252/182.1 |

FOREIGN PATENT DOCUMENTS

| | | | |
|---|---|---|---|
| CN | 102683667 | 9/2012 | |
| CN | 103370818 | 10/2013 | |
| CN | 103441303 | 12/2013 | |
| KR | 1020060134631 | 12/2006 | |
| WO | WO-2012093797 A2 * | 7/2012 | ............ H01M 4/364 |
| WO | WO 2013183974 A1 * | 12/2013 | ............. H01M 4/13 |

* cited by examiner

LITHIUM SECONDARY BATTERY

CROSS-REFERENCE TO RELATED APPLICATION

This application claims priority to and the benefit of Korean Patent Application No. 2015-0063878, filed on May 7, 2015 and Korean Patent Application No. 2014-0067150, filed on Jun. 2, 2014, the disclosure of which is incorporated herein by reference in its entirety.

BACKGROUND

1. Field of the Invention

The present invention relates to a lithium secondary battery, and more particularly, to a lithium secondary battery having excellent lifetime characteristics and charge characteristics at a high voltage.

2. Description of Related Art

As the electronic, communication, and computer industries are rapidly developed, portable electronic communication devices such as camcorders, cellphones, notebook PCs, and/or the like are dramatically improved. Thus, demand for lithium second batteries as power sources to drive the above devices is increased daily. In particular, related to eco-friendly power sources of applications such as electronic vehicles, uninterruptible power devices, power tools, satellites, and/or the like, research and development is being actively progressed in Japan, Europe, the United States of America, and/or the like as well as in Korea.

Lithium secondary batteries developed in the early 1990s among currently applied secondly batteries are composed of a negative electrode formed of a carbon material, etc., which is capable of adsorbing and ejecting lithium ions, a positive electrode formed of lithium based oxides, etc., and a non-aqueous electrolyte in which lithium salts are dissolved in a proper amount of a composite organic solvent.

However, as application ranges of the lithium secondary batteries are increased, a longer lifetime is required, and as a capacity of the battery is increased, a requirement for charging at a high voltage is increased. However, when the battery is charged at the high voltage, an amount of lithium ions is greatly increased, and instability of a structure of a positive active material is greatly increased, and decomposition of the electrolyte on the surface of the positive electrode is accelerated, and thus, the lifetime of the battery is decreased. A conventional lithium transition metal oxide or composite oxide, which is used for the positive active material of the lithium secondary battery, has a limitation in the lifetime characteristics and the charging at the high voltage.

In order to solve the above problem, Korean Patent Publication No. 10-2006-0134631 disclosed core-shell structured positive electrode active materials with high capacity and safety and their preparing method for lithium secondary batteries, but the lifetime characteristics are not increased sufficiently and the charging problem at the high voltage is not solved.

SUMMARY OF THE INVENTION

An embodiment of the present invention is directed to providing a lithium secondary battery having excellent lifetime characteristics and charge characteristics at a high voltage.

In accordance with the embodiment of the present invention, a lithium secondary battery includes: a positive electrode; a negative electrode; and a non-aqueous electrolyte, wherein the positive electrode includes a positive active material including a lithium-metal oxide in which at least one metal has the continuous concentration gradient from the center to the surface of the positive active material, and wherein the non-aqueous electrolyte includes a lithium salt, a multinitrile compound, and an organic solvent.

The lithium-metal oxide includes at least one of the metals having a constant concentration from the center to the surface of the positive active material.

The lithium-metal oxide includes a first metal having a concentration gradient range in which a concentration increases from the center to the surface of the positive active material, and a second metal having a concentration gradient range in which a concentration decreases from the center to the surface of the positive active material.

The lithium-metal oxide is represented by the following Chemical Formula 1, and at least one of M1, M2, and M3 in the following Chemical Formula 1 has the continuous concentration gradient from the center to the surface of the positive active material.

$$Li_xM1_aM2_bM3_cO_y$$ 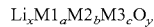 [Chemical Formula 1]

(wherein M1, M2, and M3 are selected from the group consisting of Ni, Co, Mn, Na, Mg, Ca, Ti, V, Cr, Cu, Zn, Ge, Sr, Ag, Ba, Zr, Nb, Mo, Al, Ga, and B, and $0<x\le1.1$, $2\le y\le2.02$, $0\le a\le1$, $0\le b\le1$, $0\le c\le1$, and $0<a+b+c\le1$.)

At least one of the M1, M2, and M3 has a concentration gradient range in which a concentration increases from the center to the surface, and the remainder thereof has a concentration gradient range in which a concentration decreases from the center to the surface.

One of the M1, M2, and M3 has a concentration gradient range in which a concentration increases from the center to the surface, and another one has a concentration gradient range in which a concentration decreases from the center to the surface, and the other one has a constant concentration from the center to the surface.

In the lithium secondary battery, the M1, M2, and M3 are Ni, Co, and Mn, respectively.

In the lithium secondary battery, the M1 is Ni, and $0.6\le a\le0.95$ and $0.05\le b+c\le0.4$.

In the lithium secondary battery, the shape of primary particles of the lithium-metal oxide is a rod type.

In the lithium secondary battery, the multinitrile compound includes a dinitrile compound, a trinitrile compound or a blending thereof.

In the lithium secondary battery, the multinitrile compound is composed of at least one selected from the group consisting of succinonitrile, sebarconitrile, glutaronitrile, adiponitrile, 1,5-dicyanopentane, 1,6-dicyanohexane, 1,7-dicyanoheptane, 1,8-dicyanooctane, 1,9-dicyanononane, 1,10-dicyanodecane, 1,12-dicyanododecane, tetramethyl-succinonitrile, 2-methylglutaronitrile, 2,4-dimethylglutaronitrile, 2,2,4,4,-tetramethylglutaronitrile, 1,4-dicyanopentane, 2,5-dimethyl-2,5-hexanedicarbonitrile, 2,6-dicyanoheptane, 2,7-dicyanooctane, 2,8-dicyanononane, 1,6-dicyanodecane, 1,3,5-hexanetricarbonitrile, and 1,3,6-hexanetricarbonitrile.

In the lithium secondary battery, the multinitrile compound is composed of at least one selected from the group consisting of succinonitrile, glutaronitrile, adiponitrile, 1,3,5-hexanetricarbonitrile, and 1,3,6-hexanetricarbonitrile.

In the lithium secondary battery, the multinitrile compound is included in the non-aqueous electrolyte in the range of 0.1 to 10 wt % based on the total amount of the non-aqueous electrolyte.

In the lithium secondary battery, the multinitrile compound is included in the non-aqueous electrolyte in the range of 0.5 to 7 wt % based on the total amount of the non-aqueous electrolyte.

In the lithium secondary battery, the multinitrile compound is included in the non-aqueous electrolyte by a concentration at 1 to 7 wt % based on the total amount of the non-aqueous electrolyte.

In the lithium secondary battery, the charge voltage is in the range of 4.3 to 4.5 V.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
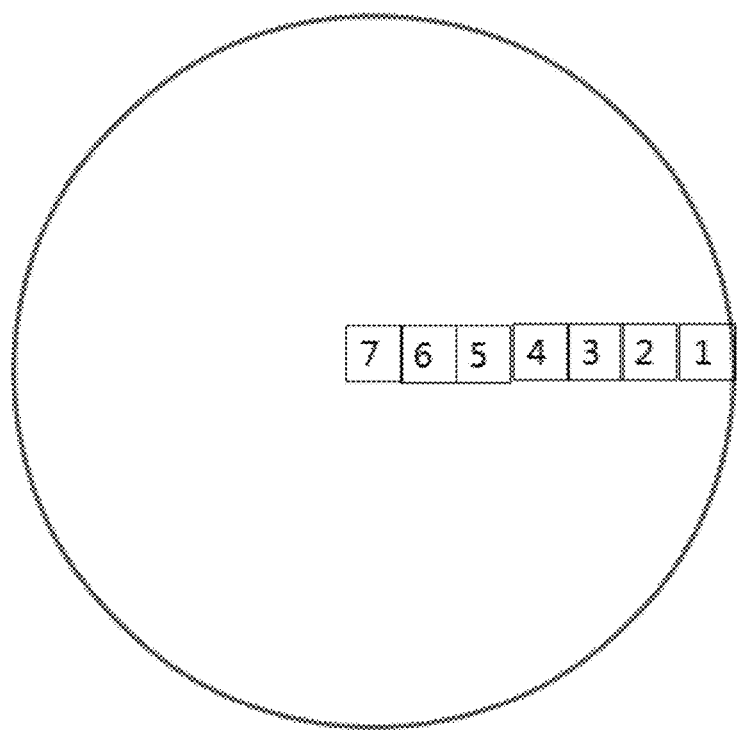
FIG. 1 is a view briefly illustrating measurement positions for measuring the concentration of lithium-metal oxide according to an example of the present invention.

According to the present invention, in a lithium secondary battery comprising a positive electrode, a negative electrode, and a non-aqueous electrolyte, the positive electrode includes a positive active material including a lithium-metal oxide in which at least one metal has a continuous concentration gradient from the center to the surface, and the non-aqueous electrolyte includes lithium salt, a multinitrile compound and an organic solvent, and thus, storage characteristics at a high temperature and lifetime characteristics are improved.

Hereinafter, the present invention will be described in detail.

Positive Electrode Active Material

A positive active material of the present invention includes a lithium-metal oxide in which at least one metal has the continuous concentration gradient from the center to the surface of the positive active material. The above positive active material has excellent storage characteristics as well as lifetime characteristics compared with a positive active material having a constant concentration.

In the present invention, the metal among the lithium-metal oxide has the continuous concentration gradient from the center to the surface of the positive active material, and thus, metal except the lithium has a concentration distribution which is changed from the center to the surface of the lithium-metal oxide particle at a constant tendency. The constant tendency represents a tendency to decrease or increase the change in an overall concentration, but does not exclude a value opposed to the above tendency at some points.

The center of the particle of the present invention refers to the range within a radius of 0.2 μm from the center of the material particle and the surface of the particle refers to the range within 0.2 μm from the outermost surface of the particle.

The positive active material of the present invention includes at least one metal having a concentration gradient. Thus, the positive active material may include a first metal having a concentration gradient range increasing from the center to the surface, and a second metal having a concentration gradient range decreasing from the center to the surface. The first metal and the second metal may independently be one or more types.

According to another embodiment of the present invention, the positive active material of the present invention may include at least one of the metals having a constant concentration from the center to the surface of the positive active material.

A specific example of the positive active material of the present invention may include a lithium-metal oxide represented by the following Chemical Formula 1, and in the following Chemical Formula 1, at least one of M1, M2, and M3 has the continuous concentration gradient from the center to the surface of the positive active material.

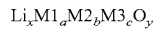  [Chemical Formula 1]

(wherein M1, M2, and M3 are selected from the group consisting of Ni, Co, Mn, Na, Mg, Ca, Ti, V, Cr, Cu, Zn, Ge, Sr, Ag, Ba, Zr, Nb, Mo, Al, Ga, and B, and $0<x\leq1.1$, $2\leq y\leq2.02$, $0\leq a\leq$, $0\leq b\leq1$, $0\leq c\leq1$, and $0<a+b+c\leq1$.)

In the embodiment of the present invention, at least one of M1, M2, and M3 has a concentration gradient range increasing from the center to the surface of the positive active material, and the remainder thereof may have a concentration gradient range decreasing from the center to the surface of the positive active material.

In another embodiment of the present invention, one of M1, M2, and M3 has a concentration gradient range increasing from the center to the surface, and another one thereof may have a concentration gradient range decreasing from the center to the surface, and the other one thereof may have a constant concentration from the center to the surface.

In a specific example of the present invention, M1, M2, and M3 may be Ni, Co, and Mn, respectively.

The lithium-metal oxide of the present invention may include a relatively high content of nickel (Ni). When nickel is used, battery capacity may be increased, and, in a conventional positive active material structure, when the nickel content is high, lifetime is decreased, but the positive active material of the present invention does not decrease lifetime although the nickel content is high. Thus, the positive active material of the present invention has excellent lifetime characteristics while maintaining the high capacity.

For example, in the lithium-metal oxide of the present invention, the molar ratio of nickel is 0.6 to 0.95, and preferably 0.7 to 0.9. That is, when M1 of the Chemical Formula 1 is Ni, the Chemical Formula 1 may include $0.6\leq a\leq0.95$ and $0.05\leq b+c\leq0.4$, and preferably, $0.7\leq a\leq0.9$ and $0.1\leq b+c\leq0.3$.

The lithium-metal oxide of the present invention is not limited to a particular particle shape thereof, but preferably, the primary particles may be a rod type.

The lithium-metal oxide of the present invention is not limited to a particular 20 particle size thereof, for example, may have a particle size in the range of 3 to 20 μm.

The positive active material of the present invention may further include a coating layer on the lithium-metal oxide. The coating layer may include a metal or metal oxide, and for example, may include Al, Ti, Ba, Zr, Si, B, Mg, P, and an alloy thereof, or include a metal oxide thereof.

The positive active material of the present invention may be the above-described lithium-metal oxide doped with a metal or metal oxide. A metal or a metal oxide, suitable for doping, may include Al, Ti, Ba, Zr, Si, B, Mg, P, and an alloy thereof, or a metal oxide thereof.

The lithium-metal oxide of the present invention may be prepared using co-precipitation.

Hereinafter, a method of preparing a positive active material according to an embodiment of the present invention will be described.

Firstly, metal precursor solutions having different concentrations are prepared. The metal precursor solutions include a precursor(s) of at least one type to be included in the positive electrode active material. Examples of the metal precursor may include a metal halide, a hydroxide, an acid salt, and/or the like.

The metal precursor solutions to be prepared include two types of precursor solutions which include a precursor solution generating a concentration of the center of the positive active material and a precursor solution generating a concentration of the surface. For example, when a metal oxide positive active material including nickel, manganese, cobalt as well as lithium is prepared, a precursor solution having a concentration of nickel, manganese, cobalt corresponding to the center of the positive active material and a precursor solution having a concentration of nickel, manganese, cobalt corresponding to the surface are prepared.

Then, the two types of metal precursor solution are mixed to form a precipitate. During the blending, a blending ratio of the two types of the metal precursor solutions is continuously changed to correspond to a concentration gradient in a desired active material. Thus, the precipitate has the concentration gradient in the active material. The precipitation is performed by adding chelating agent and a base during the blending.

The prepared precipitate is thermally treated, mixed with a lithium salt, and then thermally treated again, and thus, the positive active material of the present invention is obtained.

Negative Electrode Active Material

The negative active material of the present invention may limitlessly use any disclosed material in the art which is capable of adsorbing and ejecting lithium ions. For example, carbon materials such as a crystalline carbon, an amorphous carbon, a carbon complex, a carbon fiber, and/or the like, a lithium metal, an alloy of lithium and another element, silicon, tin, and/or the like may be used. The amorphous carbon may include a hard carbon, cokes, a mesocarbon microbead (MCMB) fired at a temperature less than or equal to 1,500° C., a mesophase pitch-based carbon fiber (MPCF), and/or the like. The crystalline carbon may include a graphite based material, in particular, such as natural graphite, graphitized cokes, graphitized MCMB, graphitized MPCF, and/or the like. Other elements which form an alloy with lithium may include aluminum, zinc, bismuth, cadmium, antimony, silicon, lead, tin, gallium, or indium.

Non-Aqueous Electrolyte

The non-aqueous electrolyte includes a lithium salt, which is an electrolyte, and an organic solvent, and further includes a multinitrile compound.

The multinitrile compound includes a compound having at least two nitrile groups, and for example, may be a dinitrile compound, a trinitrile compound or a blending thereof.

When the multinitrile compound is used with the positive active material of the present invention, charge characteristics at a high temperature are greatly improved while lifetime characteristics are maintained excellently, and theoretically, this is caused by adsorption of the multinitrile compound on the surface of the positive active material to prevent dissolution of the electrolyte, but the present invention should not be limited to the above description.

Specific examples of the multinitrile compound may include one or a blending of two or more of succinonitrile, sebarconitrile, glutaronitrile, adiponitrile, 1,5-dicyanopentane, 1,6-dicyanohexane, 1,7-dicyanoheptane, 1,8-dicyanooctane, 1,9-dicyanononane, 1,10-dicyanodecane, 1,12-dicyanododecane, tetramethylsuccinonitrile, 2-methylglutaronitrile, 2,4-dimethylglutaronitrile, 2,2,4,4,-tetramethylglutaronitrile, 1,4-dicyanopentane, 2,5-dimethyl-2,5-hexanedicarbonitrile, 2,6-dicyanoheptane, 2,7-dicyanooctane, 2,8-dicyanononane, 1,6-dicyanodecane, 1,3,5-hexanetricarbonitrile, 1,3,6-hexanetricarbonitrile, and/or the like, but are not limited to the above. Preferably, the multinitrile compound may be composed of at least one selected from the group consisting of succinonitrile, glutaronitrile, adiponitrile, 1,3,5-hexanetricarbonitrile, and 1,3,6-hexanetricarbonitrile.

The multinitrile compound is included in the non-aqueous electrolyte in the range of 0.1 to 10 wt % based on the total amount of the non-aqueous electrolyte, and preferably, in the range of 0.5 to 7 wt %, and more preferably, in the range of 1 to 7 wt %. In the above range, the charging performance at the high voltage may be excellent.

A general lithium salt in an electrolyte for the lithium secondary battery may be limitlessly used for the lithium salt, and may be represented by $Li^+X^-$. Anions of the above lithium salt are not especially limited, for example, may include $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, and/or the like.

The organic solvent may be limitlessly used for a general electrolyte in the lithium secondary battery, and any one or a blending of 2 or more selected from the group consisting of propylene carbonate (PC), ethylene carbonate (EC), diethyl carbonate (DEC), dimethyl carbonate (DMC), ethylmethylcarbonate (EMC), methylpropyl carbonate, dipropyl carbonate, dimethylsulfuroxide, acetonitrile, dimethoxyethane, diethoxyethane, vinylene carbonate, sulfolane, gamma-butyrolactone, propylene sulfite, and tetrahydrofuran may be typically used.

Secondary Battery

The present invention provides a lithium secondary battery prepared using a positive electrode including the above-described positive electrode active material, and a negative electrode including a negative electrode active material, and the above-described non-aqueous electrolyte.

The lithium secondary battery of the present invention including the above-described positive active material and the non-aqueous electrolyte is capable of being charged by the charge voltage applied in the art, and in particular, has excellent charge characteristics at a high voltage greater than or equal to 4.3 V. For example, the lithium secondary battery has excellent lifetime characteristics when the charge voltage is in the range of 4.3 to 4.5 V.

The positive electrode and the negative electrode may be prepared by blending and stirring the above-described positive active material of the present invention and the negative active material with a binder, a conductive material, a dispersant as required to prepare a composition, and the above blending is coated on a current collector of a metal material and compressed and dried, thereby preparing the positive electrode and the negative electrode.

A well-known binder may be used without limitation, for example, an organic based binder such as a polyvinylidene fluoride-hexafluoropropylene copolymer (PVDF-co-HFP), polyvinylidenefluoride (PVDF), polyacrylonitrile, polymethylmethacrylate, and/or the like, or an aqueous based binder such as styrene-butadiene rubber (SBR), and/or the like may be used with a thickener such as carboxymethyl cellulose (CMD), and/or the like.

A general conductive carbon material may be used as a conductive material without limitation.

A current collector of metal material may use any metal which has high conductivity and may be easily attached to a compound of the positive electrode or negative active material and does not react in a voltage range of the battery Non-limiting examples of a positive electrode current collector may include a foil prepared by aluminum, nickel, or a combination thereof, and non-limiting examples of a negative electrode current collector may include a foil prepared by copper, gold, nickel, copper alloy, or a combination thereof.

A separator is interposed between the positive electrode and the negative electrode, and the separator may include a mono layer or a multilayer structure using a general porous high polymer film, for example, a polyolefin based high polymer such as an ethylene homopolymer, a propylene homopolymer, an ethylene/butene copolymer, an ethylene/hexene copolymer, an ethylene/methacrylate copolymer, and/or the like, or a general porous non-woven fabric, for example, a non-woven fabric including a glass fiber with a high melting point, a polyethyleneterephthalate fiber, and/or the like, but is not limited to the above. The separator may be applied to the battery through a general winding method, lamination (stack) of the separator and the battery, a folding method, and/or the like.

The non-aqueous electrolyte is injected into an electrode structure formed with a positive electrode, a negative electrode, and the separator interposed between the positive electrode and the negative electrode, and thus, the lithium secondary battery is prepared. A shape of the lithium secondary battery of the present invention is not limited, but may have a cylindrical shape using a can, a prismatic shape, a pouch shape, a coin shape, and/or the like.

Hereinafter, the charge collecting plate for a fuel cell and a stack structure having the same according to examples of the present invention will be described in detail with reference to the enclosed drawings. It is important to understand that the present invention may be embodied in many alternative forms and should not be construed as limited to the examples set forth herein. While the invention is susceptible to various modifications and alternative forms, specific examples thereof are shown by way of example in the drawings and will herein be described in detail.

It should be understood, however, that there is no intent to limit the invention to the particular forms disclosed, but on the contrary, the invention is to cover all modifications, equivalents, and alternatives falling within the spirit and scope of the invention.

Example 1

<Positive Electrode>

A material having $LiNi_{0.8}Co_{0.1}Mn_{0.1}O_2$ as an overall composition, that is, a lithium-metal oxide (hereinafter, CAM-10) having a concentration gradient from a central composition $LiNi_{0.84}Co_{0.11}Mn_{0.05}O_2$ to the surface composition $LiNi_{0.78}Co_{0.10}Mn_{0.12}O_2$ was used as a positive electrode active material, and Denka Black was used as a conductive material, and PVDF is used as a binder, and thus, a positive active material blending having a composition of a weight ratio of 92:5:3 was prepared, and then, the positive active material blending was coated, dried, and pressed on an aluminum base, thereby preparing the positive electrode.

Here, the concentration gradient of the prepared lithium-metal oxide is the same as the Table 1 below, and positions at which the concentration was measured are shown in FIG. 1. The measurement positions were spaced apart by 5/7 μm with respect to lithium-metal oxide particles having a radius of 5 μm from the center to

TABLE 1

| position | Ni | Mn | Co |
|---|---|---|---|
| 1 | 77.97 | 11.96 | 10.07 |
| 2 | 80.98 | 9.29 | 9.73 |
| 3 | 82.68 | 7 | 10.32 |
| 4 | 82.6 | 7.4 | 10 |
| 5 | 82.55 | 7.07 | 10.37 |
| 6 | 83.24 | 5.9 | 10.86 |
| 7 | 84.33 | 4.84 | 10.83 |

<Negative Electrode>

A negative active material blending including natural graphite (d002 3.358 Å) at 93 wt % used as a negative electrode active material, a flake type conductive material KS6 at 5 wt % used as a conductive material, SBR at 1 wt % used as a binder, and CMC at 1 wt % used as a thickener was coated, dried, and pressed on a copper base, and thus, the negative electrode was prepared.

<Preparing Battery and Lifetime Characteristics Evaluation at Room Temperature>

A positive electrode plate and a negative electrode plate were notched with a proper size and stacked, and a separator (polyethylene, a thickness of 25 μm) was interposed between the positive electrode plate and the negative electrode plate to form a cell, and each of a tap portion of the positive electrode and a tap portion of the negative electrode was welded. The welded positive electrode/separator/negative active material blending was inserted in a pouch, and three sides except an injection side for injecting an electrolyte were sealed. Here, a portion at which a tap was disposed was included in the sealed portion. An electrolyte was injected through the remaining unsealed side, and the remaining side was sealed, and then, the above-structure was impregnated for more than 12 hours. The electrolyte was prepared by 1M $LiPF_6$ solution using a mixed solvent of EC/EMC/DEC (25/45/30; volume ratio), and then, vinylene carbonate (VC) at 1 wt %, 1,3-propensultone (PRS) at 0.5 wt %, lithium bis (oxalato) borate (LiBOB) at 0.5 wt %, and succinonitrile (SN) at 0.5 wt % were added to be used.

Then, a pre-charging current (2.5 A) corresponding to 0.25 C was applied for 36 minutes. After 1 hour, the above-structure was degased, and aged for more than 24 hours, and then formation charging-discharging (charging condition of CC-CV 0.2 C 4.2 V 0.05 C CUT-OFF, discharging condition CC 0.2 C 2.5 V CUT-OFF) was performed. Then, standard charging-discharging (charging condition of CC-CV 0.5 C 4.2 V 0.05 C CUT-OFF, discharging condition CC 0.5 C 2.5 V CUT-OFF) was performed.

The prepared cells were repeatedly charged (CC-CV 2.0 C 4.2 V 0.05 C CUT-OFF) and discharged (CC 2.0 C 2.75 V CUT-OFF) 500 times, and then, a discharging capacity at the 500th time was calculated with respect to percent (%) of a one-time discharging capacity to measure the lifetime characteristics at room temperature. The result is shown in Table 3.

The result is shown in Table 2.

Examples 2 to 24

A battery was prepared in the same method as Example 1 except using a content of succinonitrile and the charge voltage according to Table 2, and lifetime characteristics were evaluated, and then, the result is shown in Table 2.

Comparative Example 1

A battery was prepared in the same method as Example 1 except $LiNi_{0.8}Co_{0.1}Mn_{0.1}O_2$ (hereinafter, CAM-20) having a constant composition in an overall particle was used as a positive electrode active material, and lifetime characteristics were evaluated, and then the result is shown in Table 3.

Comparative Examples 2 to 28

A battery was prepared in the same method as Comparative Example 1 except a content of succinonitrile and the charge voltage were varied according to Table 2, and lifetime characteristics were evaluated, and then, the result is shown in Table 3.

TABLE 2

|  | positive electrode active material | SN (content, wt %) | charge voltage (V) | Lifetime (%) (500 cycle) |
|---|---|---|---|---|
| Example 1 | CAM-10 | 0.5 | 4.2 | 80 |
| Example 2 | CAM-10 | 1.0 | 4.2 | 80 |
| Example 3 | CAM-10 | 3.0 | 4.7 | 79.5 |
| Example 4 | CAM-10 | 5.0 | 4.2 | 79 |
| Example 5 | CAM-10 | 7.0 | 4.2 | 78.4 |
| Example 6 | CAM-10 | 9.0 | 4.2 | 74 |
| Example 7 | CAM-10 | 0.5 | 4.3 | 65 |
| Example 8 | CAM-10 | 1.0 | 4.3 | 71 |
| Example 9 | CAM-10 | 3.0 | 4.3 | 75 |
| Example 10 | CAM-10 | 5.0 | 4.3 | 76 |
| Example 11 | CAM-10 | 7.0 | 4.3 | 78 |
| Example 12 | CAM-10 | 9.0 | 4.3 | 65 |
| Example 13 | CAM-10 | 0.5 | 4.4 | 58 |
| Example 14 | CAM-10 | 1.0 | 4.4 | 62 |
| Example 15 | CAM-10 | 3.0 | 4.4 | 72 |
| Example 16 | CAM-10 | 5.0 | 4.4 | 74 |
| Example 17 | CAM-10 | 7.0 | 4.4 | 75 |
| Example 18 | CAM-10 | 9.0 | 4.4 | 61 |
| Example 19 | CAM-10 | 0.5 | 4.5 | 29 |
| Example 20 | CAM-10 | 1.0 | 4.5 | 35 |
| Example 21 | CAM-10 | 3.0 | 4.5 | 42 |
| Example 22 | CAM-10 | 5.0 | 4.5 | 51 |
| Example 23 | CAM-10 | 7.0 | 4.5 | 62 |
| Example 24 | CAM-10 | 9.0 | 4.5 | 10 |

TABLE 3

|  | positive electrode active material | SN (content, wt %) | charge voltage (V) | Lifetime (%) (500 cycle) |
|---|---|---|---|---|
| Comparative Example 1 | CAM-20 | 0 | 4.2 | 70 |
| Comparative Example 2 | CAM-20 | 0.5 | 4.2 | 70 |
| Comparative Example 3 | CAM-20 | 1.0 | 4.2 | 70 |
| Comparative Example 4 | CAM-20 | 3.0 | 4.2 | 69.5 |
| Comparative Example 5 | CAM-20 | 5.0 | 4.2 | 69 |
| Comparative Example 6 | CAM-20 | 7.0 | 4.2 | 68.8 |
| Comparative Example 7 | CAM-20 | 9.0 | 4.2 | 62 |
| Comparative Example 8 | CAM-20 | 0 | 4.3 | 50 |
| Comparative Example 9 | CAM-20 | 0.5 | 4.3 | 51 |
| Comparative Example 10 | CAM-20 | 1.0 | 4.3 | 52 |
| Comparative Example 11 | CAM-20 | 3.0 | 4.3 | 54 |
| Comparative Example 12 | CAM-20 | 5.0 | 4.3 | 56 |
| Comparative Example 13 | CAM-20 | 7.0 | 4.3 | 58 |
| Comparative Example 14 | CAM-20 | 9.0 | 4.3 | 45 |
| Comparative Example 15 | CAM-20 | 0 | 4.4 | 30 |
| Comparative Example 16 | CAM-20 | 0.5 | 4.4 | 31 |
| Comparative Example 17 | CAM-20 | 1.0 | 4.4 | 1.2 |
| Comparative Example 18 | CAM-20 | 3.0 | 4.4 | 34 |
| Comparative Example 19 | CAM-20 | 5.0 | 4.4 | 36 |
| Comparative Example 20 | CAM-20 | 7.0 | 4.4 | 38 |
| Comparative Example 21 | CAM-20 | 9.0 | 4.4 | 2.6 |
| Comparative Example 22 | CAM-20 | 0 | 4.5 | 10 |
| Comparative Example 23 | CAM-20 | 0.5 | 4.5 | 11 |
| Comparative Example 24 | CAM-20 | 1.0 | 4.5 | 12 |
| Comparative Example 25 | CAM-20 | 3.0 | 4.5 | 14 |
| Comparative Example 26 | CAM-20 | 5.0 | 4.5 | 16 |
| Comparative Example 27 | CAM-20 | 7.0 | 4.5 | 18 |
| Comparative Example 28 | CAM-20 | 9.0 | 4.5 | 5 |

Referring to Tables 2 and 3, batteries of the examples had excellent lifetime characteristics and charge characteristics at the high temperature compared with the comparative examples.

In particular, when the charge voltage was 4.2 V the examples have greater lifetime absolute values than the comparative examples, in particular, lifetime decreases in the examples were smaller than those in the comparative examples, and when 4.3 V, 4.4 V 4.5 V were respectively compared, lifetime increases as well as lifetime absolute values were remarkable.

Also, when a content of SN was 1 to 7 wt % at the charge voltage of greater than or equal to 4.3 V, lifetime characteristics were increased, and in particular, lifetime increases in the examples were greater than those in the comparative examples.

Figure 2:
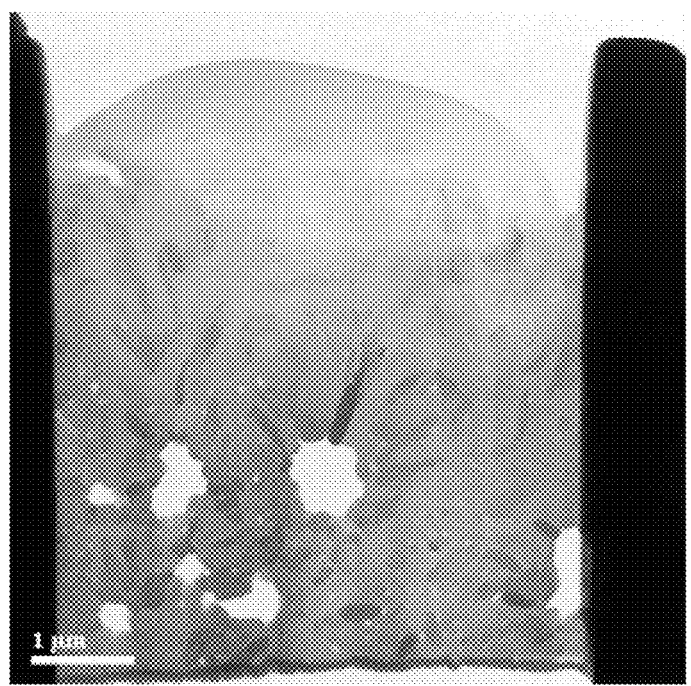
FIG. 2 is a TEM image of a lithium-metal oxide according to Example 1 of the present invention.
Figure 3:
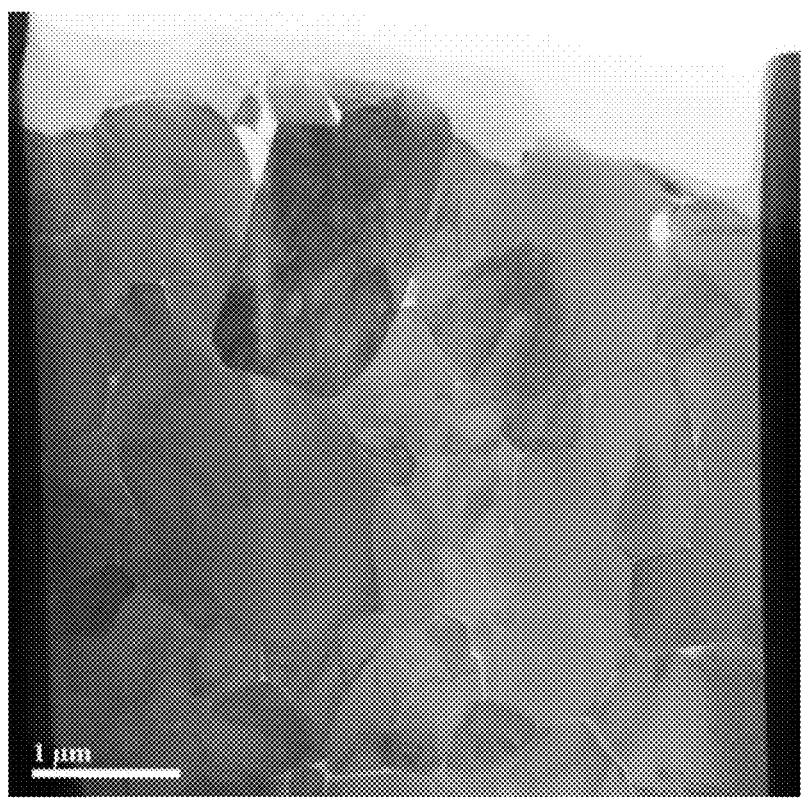
FIG. 3 is a TEM image of a lithium-metal oxide according to Comparative Example 1 of the present invention.

Also, TEM images of the positive active material particles of Example 1 and Comparative Example 1 are shown in FIGS. 2 and 3, respectively. Referring to FIG. 2 (Example 1) and FIG. 3 (Comparative Example 1), a first particle of the positive active material of Example 1 has a rod type, but a first particle of the positive active material of Comparative Example 1 has a substantially spherical shape.

Examples 24 and 25

A battery was prepared in the same method as Example 9 except a type of multinitrile compound (glutaronitrile (GN), adiponitrile (AN), 1,3,5-hexanetricarbonitrile (HTCN)) and charge voltages were varied according to Table 4, and lifetime characteristics were evaluated, and then the result is shown in Table 4.

TABLE 4

| | positive electrode active material | multinitrile type | (content, wt %) | charge voltage (V) | lifetime (%) (500 cycle) |
|---|---|---|---|---|---|
| Example 9 | CAM-10 | SN | 3 | 4.3 | 75 |
| Example 2 | CAM-10 | GN | 3 | 4.3 | 74 |
| Example 3 | CAM-10 | AN | 3 | 4.3 | 75 |
| Example 4 | CAM-10 | HTCN | 3 | 4.3 | 75 |
| Example 15 | CAM-10 | SN | 3 | 4.4 | 72 |
| Example 6 | CAM-10 | GN | 3 | 4.4 | 73 |
| Example 7 | CAM-10 | AN | 3 | 4.4 | 72 |
| Example 8 | CAM-10 | HTCN | 3 | 4.4 | 73 |
| Example 21 | CAM-10 | SN | 3 | 4.5 | 42 |
| Example 10 | CAM-10 | GN | 3 | 4.5 | 41 |
| Example 11 | CAM-10 | AN | 3 | 4.5 | 42 |
| Example 12 | CAM-10 | HTCN | 3 | 4.5 | 42 |

Referring to Table 4, various multinitrile compounds had a similar performance to succinonitrile, and had excellent lifetime characteristics and charge characteristics at a high voltage.

According to the lithium secondary battery of the present invention, the positive active material including a metal having the continuous concentration gradient is combined with the non-aqueous electrolyte including a specific addition agent, and thus, lifetime characteristics are greatly improved and charge characteristics at the high temperature are excellent.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A lithium secondary battery comprising:
a positive electrode;
a negative electrode; and
a non-aqueous electrolyte including a lithium salt, an organic solvent and a multinitrile compound, wherein the multinitrile compound consists of one or more non-fluorinated multinitrile compounds,
wherein the positive electrode includes a positive active material including a lithium-metal oxide represented by the following Chemical Formula 1,

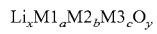 Chemical Formula 1 wherein M1, M2, and M3 are selected from the group consisting of Ni, Co, Mn, Na, Mg, Ca, Ti, V, Cr, Cu, Zn, Ge, Sr, Ag, Ba, Zr, Nb, Mo, Al, Ga, and B, and $0<x\leq1.1$, $2\leq y\leq2.02$, $0<a1$, $0<b<1$, $0<c<1$, and $0a+b+c\leq1$, wherein M3 has a concentration gradient range in which a concentration increases continuously from a center of the positive active material to a surface of the positive active material, M1 has a concentration gradient range in which a concentration decreases continuously from the center of the positive active material to the surface of the positive active material, and M2 has a constant concentration from the center of the positive active material to the surface of the positive active material, and wherein M1 is nickel, and a of Formula 1 is 0.7797 or more throughout an entire region of the positive active material.

2. The lithium secondary battery of claim 1, wherein the M2, and M3 are Co, and Mn, respectively.

3. The lithium secondary battery of claim 2, wherein the a, b, and c of Formula 1 satisfy the relationships $0.7797\leq a\leq0.95$ and $0.05\leq b+c\leq0.4$.

4. The lithium secondary battery of claim 1, wherein a shape of primary particles of the lithium-metal oxide is a rod type.

5. The lithium secondary battery of claim 1, wherein the non-fluorinated multinitrile compound includes a dinitrile compound, a trinitrile compound or a blending thereof.

6. The lithium secondary battery of claim 1, wherein the non-fluorinated multinitrile compound is composed of at least one selected from the group consisting of succinonitrile, sebarconitrile, glutaronitrile, adiponitrile, 1,5-dicyanopentane, 1,6-dicyanohexane, 1,7-dicyanoheptane, 1,8-dicyanooctane, 1,9-dicyanononane, 1,10-dicyanodecane, 1,12-dicyanododecane, tetramethylsuecinonitrile, 2methylglutaronitrile, 2,4-dimethylglutaronitrile, 2,2,4,4,-tetramethylglutaronitrile, 1,4-dicyanopentane, 2,5-dimethyl-2,5-hexanedicarbonitrile, 2,6-dicyanoheptane, 2,7-dicyanooctane, 2,8-dicyanononane, 1,6-dicyanodecane, 1,3,5-hexanetricarbonitrile, and 1,3,6-hexanetricarbonitrile.

7. The lithium secondary battery of claim 1, wherein the non-fluorinated multinitrile compound is composed of at least one selected from the group consisting of succinonitrile, glutaronitrile, adiponitrile, 1,3,5-hexanetricarbonitrile, and 1,3,6-hexanetricarbonitrile.

8. The lithium secondary battery of claim 1, wherein the multinitrile compound is included in the non-aqueous electrolyte in a range of 0.1 to 10 wt % based on a total amount of the non-aqueous electrolyte.

9. The lithium secondary battery of claim 1, wherein the multinitrile compound is included in the non-aqueous electrolyte in a range of 0.5 to 7 wt % based on a total amount of the non-aqueous electrolyte.

10. The lithium secondary battery of claim 1, wherein the multinitrile compound is included in the non-aqueous electrolyte by a concentration at 1 to 7 wt % based on a total amount of the non-aqueous electrolyte.

11. The lithium secondary battery of claim 1, wherein a charge voltage is in a range of 4.3 to 4.5 V.

* * * * *